United States Patent [19]
Jerzycke et al.

[11] Patent Number: 5,346,345
[45] Date of Patent: Sep. 13, 1994

[54] HIGH-FORCE LINEAR MOTOR ASSEMBLY USING TANDEM AXES

[75] Inventors: Charles L. Jerzycke, Northville; Richard Ogletree, Southfield, both of Mich.; Frederick A. Sommerhalter, Jr., Oyster Bay, N.Y.

[73] Assignee: Ford Motor Company, Dearborn, Mich.

[21] Appl. No.: 923,700

[22] Filed: Jul. 31, 1992

[51] Int. Cl.$^5$ .............................................. B23Q 1/02
[52] U.S. Cl. .................................. 409/235; 408/234; 409/191
[58] Field of Search .................. 408/62, 234; 409/190, 409/191, 235, 236

[56] References Cited

U.S. PATENT DOCUMENTS

| | | | |
|---|---|---|---|
| 3,348,795 | 10/1967 | Schilling | 408/234 |
| 3,534,657 | 10/1970 | Wagner | 409/190 |
| 3,749,509 | 7/1973 | Lukoshnikov | 409/235 |
| 4,102,035 | 7/1978 | Voglrieder et al. | |
| 4,359,814 | 11/1982 | Pihery et al. | |
| 4,392,642 | 7/1983 | Chitayat | |
| 4,505,464 | 3/1985 | Chitayat | |
| 4,571,799 | 2/1986 | Chitayat | |
| 4,761,876 | 8/1988 | Kosmowski | |
| 4,985,651 | 1/1991 | Chitayat | |
| 5,161,926 | 11/1992 | Schulz | 409/235 |

FOREIGN PATENT DOCUMENTS

| | | | |
|---|---|---|---|
| 3440786 | 7/1986 | Fed. Rep. of Germany | 409/236 |
| 209840 | 9/1986 | Japan | 409/235 |

*Primary Examiner*—Daniel W. Howell
*Attorney, Agent, or Firm*—Joseph W. Malleck; Roger L. May

[57] ABSTRACT

A linear motor assembly having enhanced mechanical stiffness, comprising: (a) at least one pair of rigidly interconnected tandem rails defining a first axis of movement and spaced apart normal to such first axis; (b) at least one pair of frames movable along said pair of rails, each frame presenting at least one pair of opposed parallel bearing surfaces; (c) at least one linear motor effective to operate between each rail and frame; (d) bearings supported between each rail and each bearing surface of each frame, said bearings being preloaded with an interference load while permitting bearing movement; and (e) support structure between said frames defining axes of movement actuated by other linear motors.

15 Claims, 7 Drawing Sheets

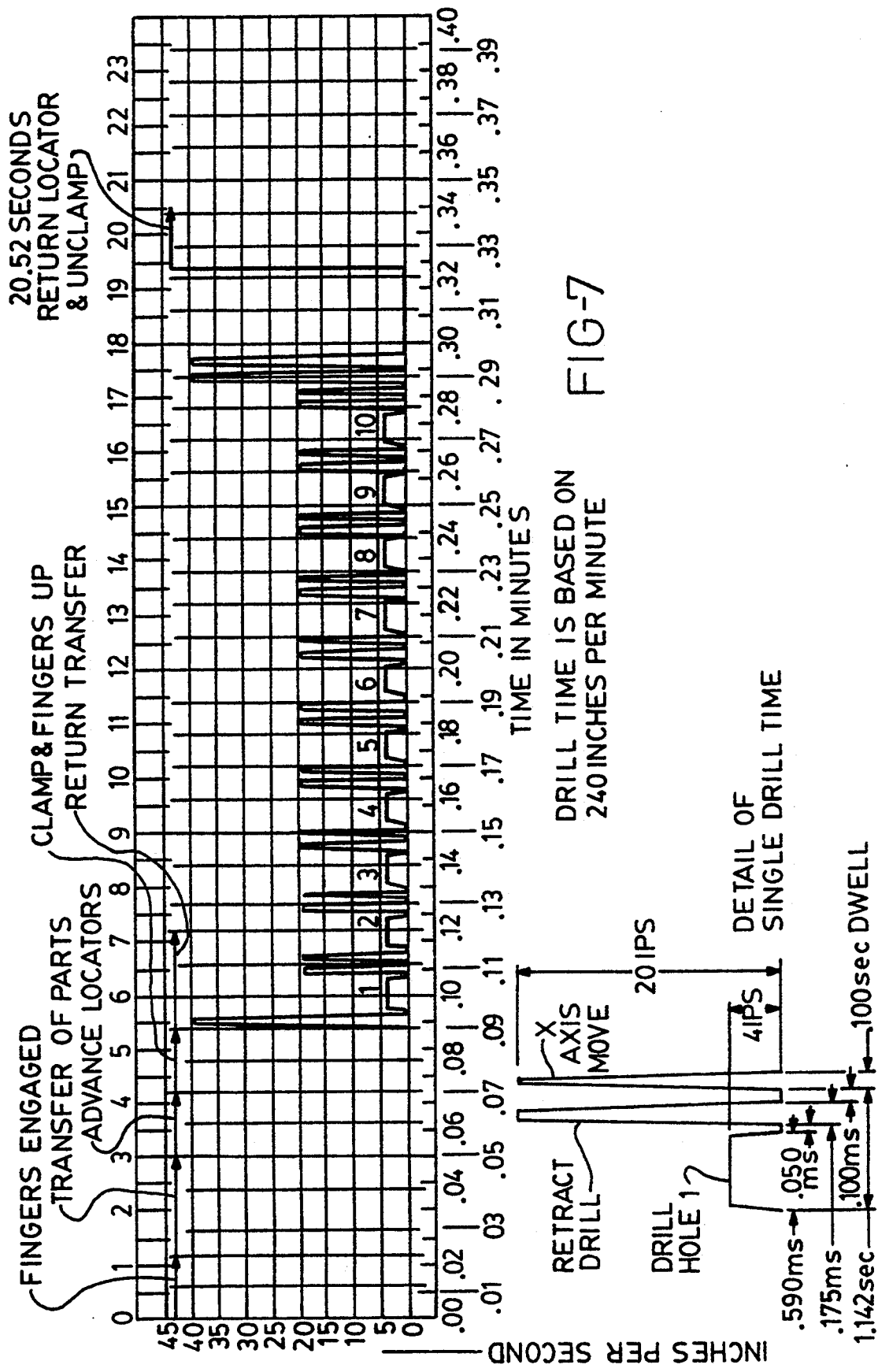

HIGH-FORCE LINEAR MOTOR ASSEMBLY USING TANDEM AXES

BACKGROUND OF THE INVENTION

1. Technical Field

This invention relates to positioning assemblies utilizing electrical linear motors and, more particularly, to assemblies that accelerate a movable tooling element approaching or exceeding one G.

2. Discussion of the Prior Art

Moving a heavy-duty cutting tool to sequential positions for carrying out a machining task has been conventionally carried out by use of three-axis positioners actuated and controlled by ball-screw drives (see U.S. Pat. Nos. 4,102,035 and 4,359,814). If electrical linear motors were to be substituted for such ball-screw drives, the disadvantageous slow wind-up characteristic of the ball-screw drive would be eliminated and unprecedented acceleration/deceleration would be possible.

Unfortunately, accuracy of positioning of the tooling would be diminished by the mere substitution, without uniquely controlling the force generated by the motors. Moreover, power control alone is insufficient to assure position preciseness if the assembly flexes or distorts variably in reaction to the thrust force of each motor. Such distortion is related not only to the natural flexing frequency of the supporting structure but also to the type of bearing contact with the movable elements.

Heretofore, table positioners using linear motors have employed air bearings (see U.S. Pat Nos. 4,392,642; 4,571,799; 4,985,651; and 4,761,876). Air bearings are made feasible by use of ultra-flat, inflexible granite surfaces and by limiting the movable element to a very light element such as needed for assembly or machining of light electronic components. Air bearings are undesirable because they require special support and guide surfaces that cannot be maintained in a heavy-duty, mass-machining environment for automotive components, and are undesirable because they are insufficiently dimensionally stiff when deployed to move large tooling at high accelerations.

Magnetic loading to increase stiffness of a linear motor assembly has been used in conjunction with sliding or roller bearings (see U.S. Pat. No. 4,505,464 and 4,985,651). Magnetic loading of bearings does little to enhance stiffness because it is imprecise and weak; magnetic loading is primarily suited to a use that assists in following more closely a guide track and therefore does little to promote stiffness of the linear motor assembly.

SUMMARY OF THE INVENTION

In a first aspect, the invention is an assembly comprising: (a) at least one pair of rigidly interconnected tandem rails defining a first axis of movement and spaced apart normal to such first axis; (b) at least one pair of interconnected frames movable along said pair of rails, each frame presenting at least one pair of opposed parallel bearing surfaces; (c) at least one linear motor effective to operate between each rail and frame to selectively move said frames; (d) bearings supported between each rail and each bearing surface of each frame, each bearing being preloaded with an interference load while permitting bearing movement; and (e) means supported by said frames defining other axes of movement actuated by other linear motors.

In a second aspect, the invention is a method of increasing flexible productivity for drilling a plurality of openings in sequence in a workpiece, comprising: (a) indexing, feeding, and sequentially reindexing, in a predetermined order, a drilling spindle over a plurality of opening sites in a single workpiece by use of a linear motor assembly having at least one axis of movement stiffened by two rigidly interconnected parallel rails spaced apart normal to such axis, the assembly having roller bearings movingly supporting the drilling spindle on said rails with an interference fit, said indexing and feeding being carried out at an acceleration/deceleration of at least about one G and the drilling spindle being rotated at speeds between 10,000–40,000 rpm.

BRIEF DESCRIPTION OF THE DRAWINGS

FIG. 7 is a cycle chart illustrating the degree of movement of the spindle along the respective X, Y, or Z axes to carry out drilling of a series of openings in an engine block workpiece.

DETAILED DESCRIPTION AND BEST MODE

Figure 1:
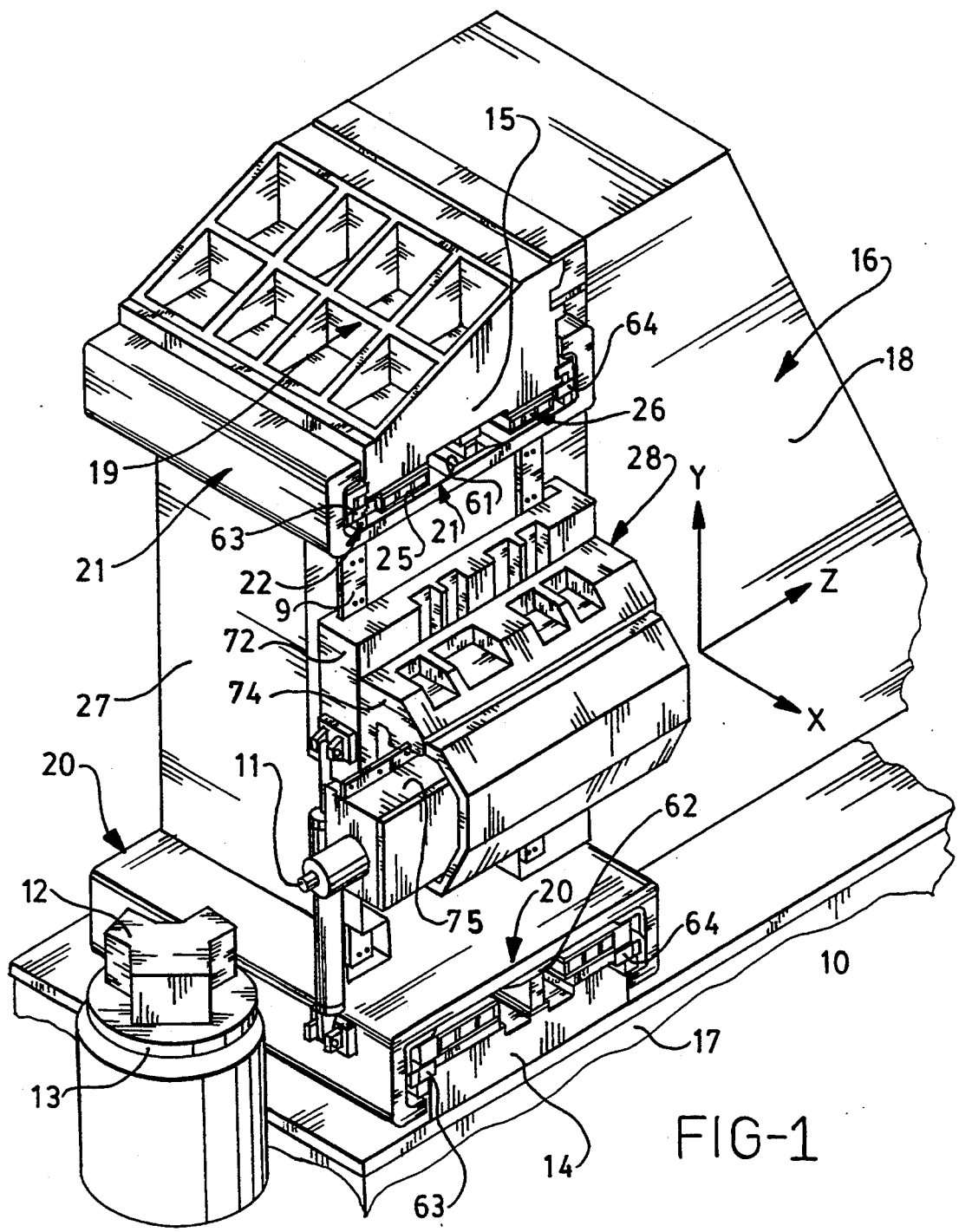
FIG. 1 is a respective view of a rapid positioning machine embodying the principles of this invention useful for drilling automotive components such as an engine cylinder block or head.

The rapid positioning machine 10 equipped with a single spindle 11, shown in FIGS. 1–6, is capable of carrying out ultra-rapid sequential machining (i.e., drilling of a series of openings) in or on a workpiece 12 (such as an engine block shown in FIG. 1) adjustably supported on a worktable 13. Although not shown in FIG. 1, the worktable should deploy a fixture 90 (see FIG. 2) for clamping the workpiece 12 in a rigid fixed condition that prevents deflection of the workpiece under the thrust forces of the tool while carrying out machining, and eliminates the spring effect of any hydraulic gripper or clamps. The machine has freedom to move the spindle 11 in three mutually perpendicular axes (X, Y, and Z) for effecting positioning of the spindle, although it is possible that additional degrees of movement freedom can be incorporated, such as rotation about any of the linear axes, without departing from this invention. The Z-axis permits linear feeding of the drill bit carried by the spindle into the workpiece, the Y-axis provides for vertical movement of the spindle 11, and the X-axis allows for movement in a horizontal plane.

Figure 2:
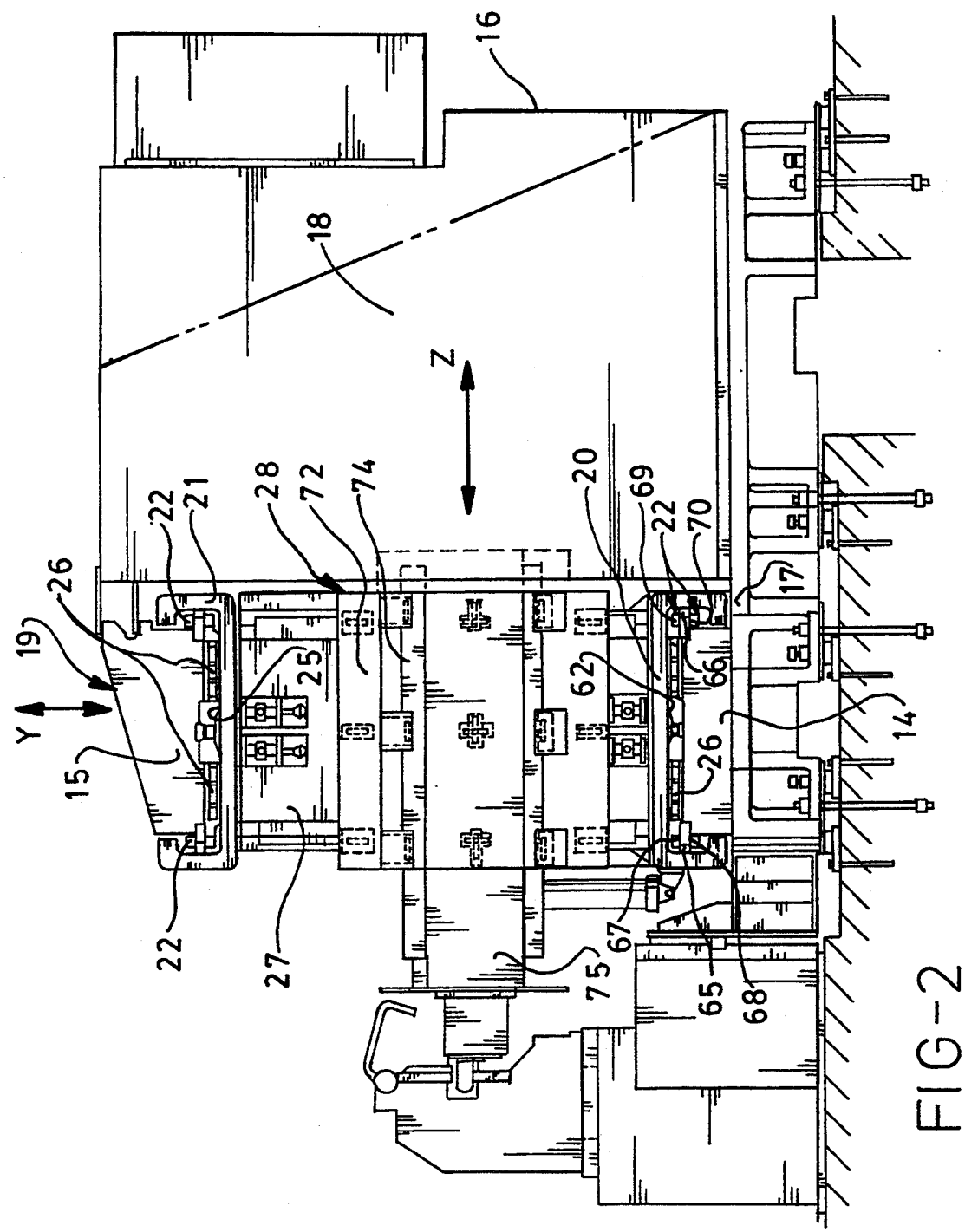
FIG. 2 is essentially a side elevational view of FIG. 1.
Figure 5:
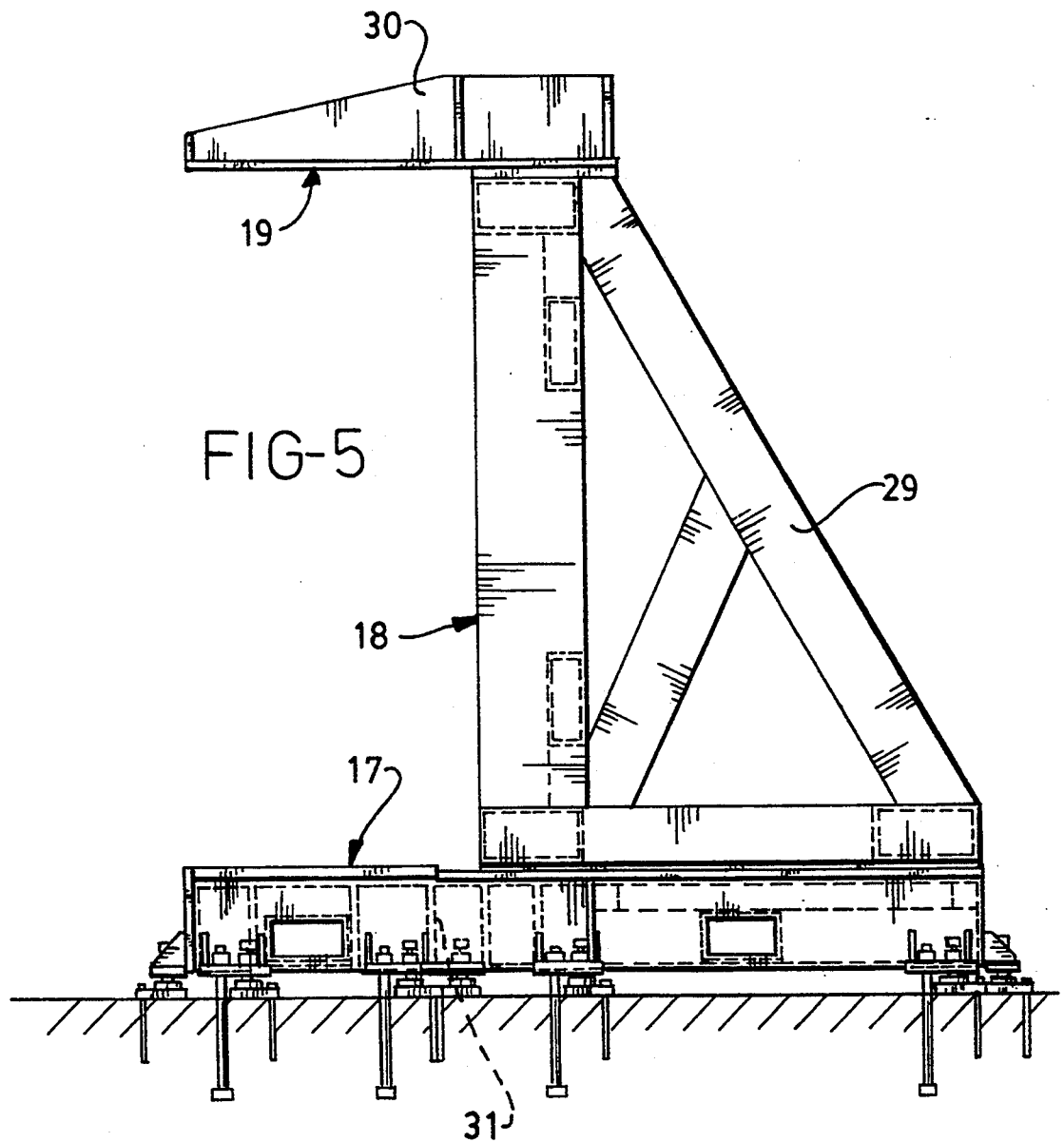
FIG. 5 is an elevational view of one structure used to fixedly interconnect the movable X-axis frames.

At least one pair of tandem rails 14, 15 define the X-axis of movement for the spindle 11, such rails being spaced apart along the Y-axis by a distance preferably in the range of 40–80 inches. The rails are rigidly interconnected by a fixed structure 16 which is desirably made of heavy steel plate and filled with sand in its base portion 17 to dampen vibrations from any applied forces. The interconnecting structure 16 has an upright column portion 18 standing on the bed portion 17. A cantilevered upper portion 19 carries rail 15, and bed 17 carries rail 14. The upright column portion 18 may be constructed as a boxed weldment, as shown in FIGS. 1-2, or as a trussed frame 29, as shown in FIG. 5. The upper portion 19 may be an open weldment having a number of webs 30, and the bottom portion 17 may be a weldment with a plurality of bulkheads 31.

Alternatively, the tandem rails may define a Z-axis of movement for spindle 11, such rails being spaced apart along the X-axis. The rails would be interconnected by a horizontally extending bed. The frames would movingly sit on the rails interconnected by a trussed superstructure, preferably triangular in elevations. A movable Y-axis slide and a movable Z-axis ram could be carried by the trussed superstructure.

Returning to FIGS. 1-6, movable lower frame 20 wraps around rail 14 and movable upper frame 21 wraps around rail 15. Each frame has a C-shaped cross-section (although L-shaped cross-sections could also serve the purposes of this invention) and the frames are oriented opposite to each other. Controlled movement of the frames is made possible by a plurality of roller bearing units 22 between bearing surfaces 23 on the rail exterior 24 and frame interior 25. Linear motors 26 are disposed between the rails and the frames to provide selective actuation or movement along the X-axis.

A column 27 fixedly connects the pair of frames 20, 21; such column supports other structure 28 which facilitates movement of the spindle 11 along or about other axes (i.e., Y and Z axes). Such column and other structure 28 are preferably constituted of lightweight metal such as aluminum alloy. Such intermediate structure may comprise an upright column 27, which has upright rails 9 thereon to define a Y-axis of movement, and a slide 72 adapted to wrap around such rails similar to that of the C-shaped cross-sectional frames. A saddle 74 is joined to the slide 72 and presents a C-shaped frame effective to cooperate in defining a Z-axis similar to that provided by the C-shaped cross-sectional frames for the X-axis. A ram 75 is movable within the saddle 74, the ram carrying a rotary-driven spindle 11 at one end thereof. The mass of the column and other structure 28 is substantially reduced by making the column 27 hollow and using a cellular skeleton therein. The use of C-shaped slide and saddle members and the use of a webbed skeleton for the ram reduce mass. The combination of the cellular skeleton for each of the components of the column and other structure 28, use of lightweight materials to reduce weight therein, and the use of rigidly-tied tandem axes makes possible an increased natural frequency for such structure which is in the range of 100-200 Hz (about 116 Hz for the preferred embodiment), and optimally at or above 180 Hz.

Figure 3:
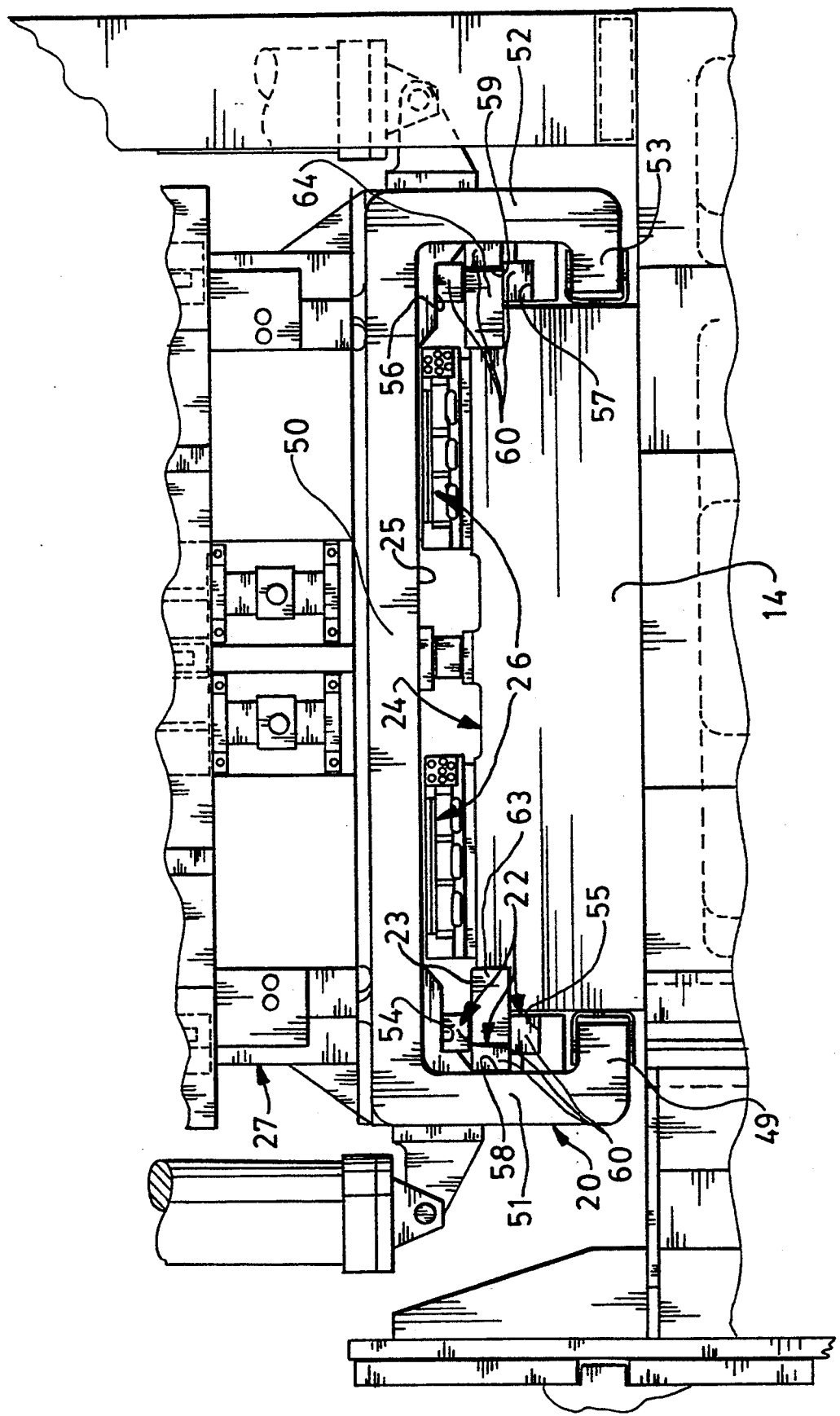
FIG. 3 is an enlarged sectional view of one of the movable frames and its associated structure adapted for movement along the X-axis.
Figure 4:
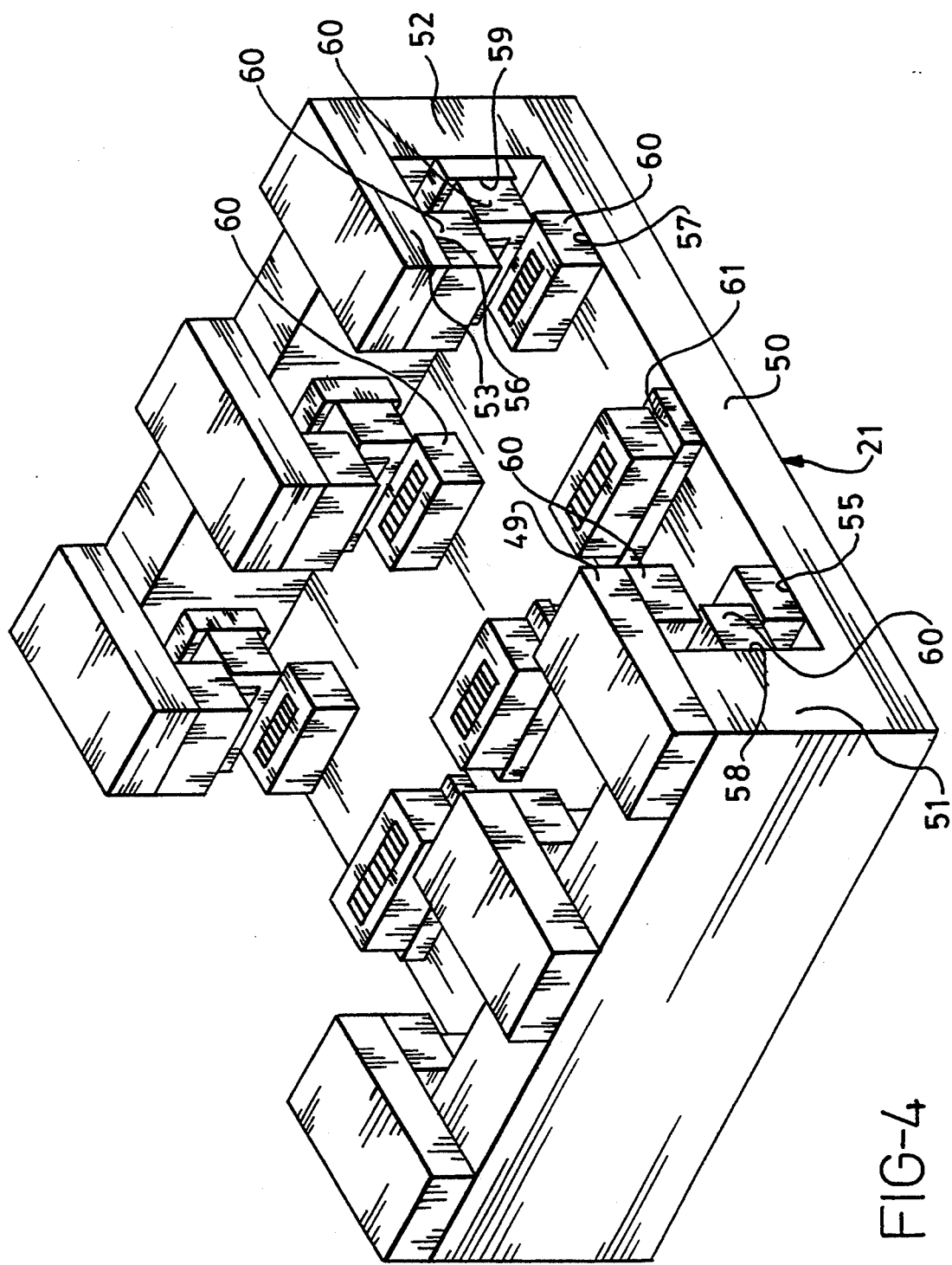
FIG. 4 is an enlarged perspective view of a preferred bearing assembly for a frame showing the architecture of roller circulation and preloading.

As shown in FIGS. 3 and 4, each frame 20, 21 is comprised of an aluminum alloy material having a web 50, integral arms 51, 52, and integral fingers 49, 53. Each frame presents three pairs of opposed inwardly-facing, parallel bearing surfaces, and the two frames together present an additional pairs of parallel bearing surfaces (one surface of each pair being on each frame about the midsection of a span in the X-directions and at about the midsection for the span in Z-directions). More specifically, each frame presents a first pair of bearing surfaces 54, 55, a second pair 56, 57, and a third pair 58, 59. The bearing surfaces engage a plurality of recirculating roller bearings in units 60 which have roller bearings recirculating within the unit. A number of units may be spaced along each bearing surface, as shown in FIG. 4. Frame 20 will present the mere image of the same bearing surfaces and bearing units as for frame 21. Frame 21 provides a bearing surface 61, and frame 20 provides an opposing bearing surface 62 to form yet still another opposed pair of surfaces. Pair 61, 62 is useful when the width of the frame exceeds a certain dimension, such as 36 inches. More than one pair of surfaces 61, 62 may be deployed as needed for the bearing units shown in FIG. 4.

The rails (14, 15) extend into the interior of one of such frames, the rails presenting pairs of outwardly-facing bearing surfaces complementary to the bearing surfaces on the frame; the rail surfaces are provided principally on attached tongues 63, 64 extending outwardly from the rail sides. As shown in FIG. 2, rail 14 has a first pair of outwardly-facing, opposed bearing surfaces identified as 65, 66, a second pair of surfaces 67, 68, and a third pair 69, 70. For rail 15, the mere image of such bearing surfaces is provided.

Between such pairs of inwardly-facing bearing surfaces on the frames and the outwardly-facing bearing surfaces on each of the rails there is disposed the roller bearing units 60, each having a recirculating track with at least one roller bearing adapted to bear against the inwardly-facing surface of the frame and other roller bearings adapted to bear against the outwardly-facing surface of the rail.

The contact between the rollers of the roller bearing units and the frame and rail is with a controlled interference fit through increased preloading. Such fit is defined to mean that the bearing races or cage, and possibly the rollers, rail, or frame, deform below the yield point of the metal to accommodate roller movement. This deformation enhances the accuracy of positioning without increasing the weight of the structure. Such interference fit is desirably in the range of 10-20% of the maximum bearing loads to achieve rigidity comparable to that of 2000 pounds. The preloading for an interference fit can be obtained by either adjusting the bearing preloaded blocks 63, 64 or precisely machining the gap between drums 50 and 52. Such tight-fitting bearing provides a dimensional interference fit in the range of 0.0002-0.0005 inches when using steel alloy rollers and steel rails and aluminum alloy frames.

Figure 6:
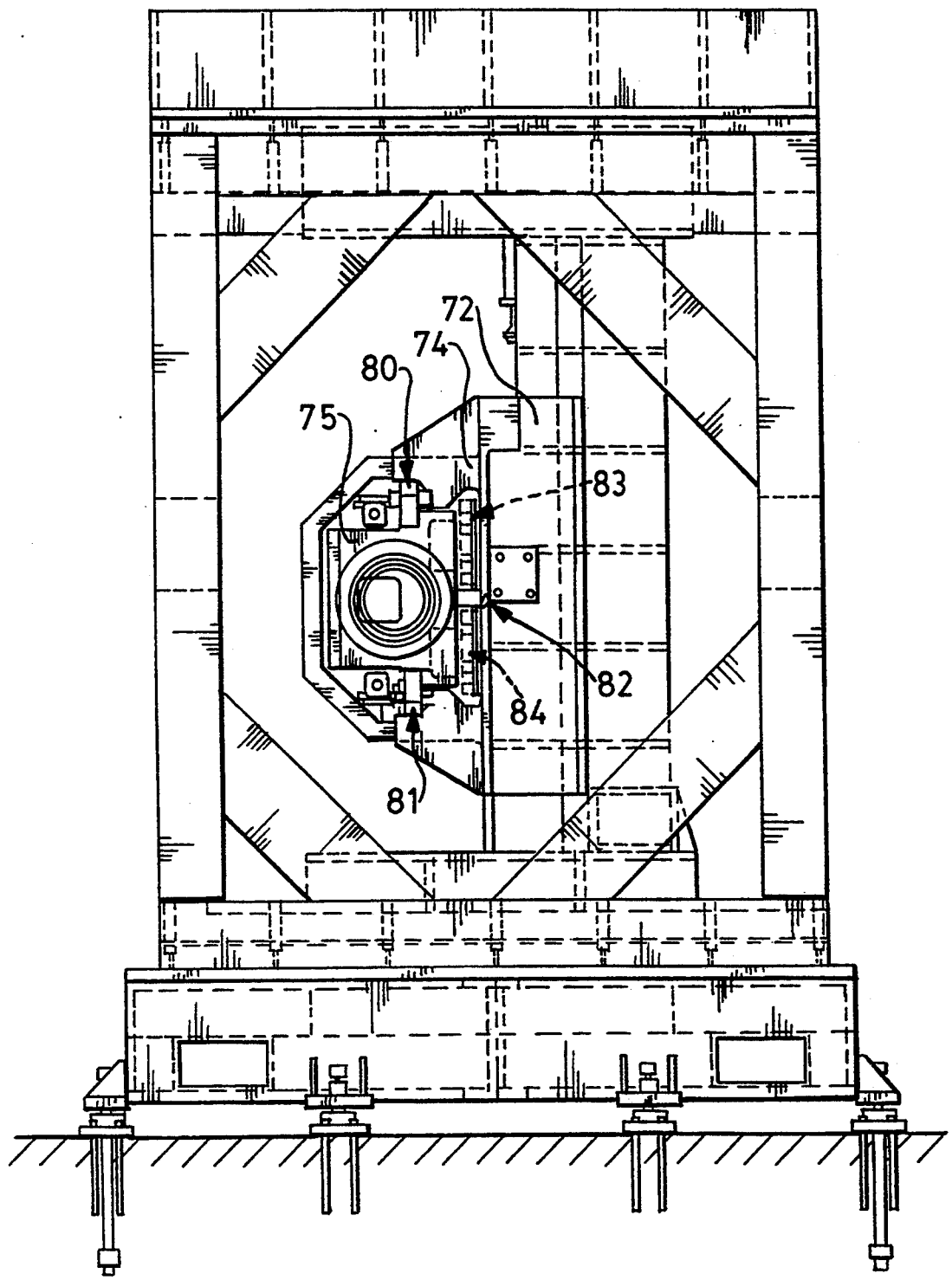
FIG. 6 is a rear elevational view of the structure of FIG. 5 with the ram and slide superimposed.

The linear motors deployed between the support elements of the positioner are high-force, brushless DC motors having 500-2000 pounds peak force. Such motors consist of an elongated stator, preferably coil packs, and a linear moving element, preferably rows of supported permanent magnets. Permanent magnets and coil packs can be interchanged between stator and movable element in any specific application. In the embodiment illustrated herein, power coil packs form the stator between the rails 14, 15 and the movable frames 20, 21. A pair of coil packs 26 are mounted on the top of rail 14 and a pair of coil packs 26 are mounted on the bottom of rail 15. Coil packs also form the stator between the saddle 74 and the movable ram 75, as shown in FIG. 6. However, the permanent magnets form the stator for linear motors between the slide 72 and the column 27. Coil packs are mounted on the column itself to cooperate with the magnets of the slide.

As shown in copending application U.S. Ser. No. 07/924,692, filed Jul. 31, 1992, entitled "Three-Axis Linear Motor Positioner with Y-Axis supported at Single End", commonly assigned to the assignee herein, each coil pack is constructed of ferromagnetic plates laminated in an epoxy material to provide slots in which coil windings are deposited therearound prior to encapsulation. Potting techniques are used throughout the lamination so that the coils are embedded in the material devoid of bubbles or contaminants, the latter inhibiting heat transfer and thereby decreasing the life of the coils. The coils may be connected in series within a pack and the packs connected in parallel to a power control. Such control may supply the coils with two, three, or more phases; suitable commutation is used to change the polarity of the coils to keep a constant electromagnetic thrust force in one desired direction to promote linear motion. The permanent magnets are preferably a rare earth type, such as NdFeB type, providing an unusually high flux density.

Cooling channels are incorporated into a ferromagnetic platform that is in intimate contact with each of the ferromagnetic cores for the coil windings. Cooling fluid is forced through the channels to dissipate high heat generated by the motor induction, such cooling supplementing any confective cooling achieved by circulating a gas about the motor coil packs.

Bearing assemblies cooperate with the linear motors for the intermediate structure 28 in the same fashion as the bearing units were deployed for each of the frames 20, 21. For example, the slide 72 has a C-shaped cross-section, and the saddle 74 has structure which simulate the rails 14, 15 so that clusters of recirculating bearing units may be deployed in a similar fashion. Similarly, saddle 74, in cooperation with a closure plate 76, defines a C-shaped cross-section in which the ram is free to move; the ram has extensions which simulate the rails 14, 15 so that they would be surrounded by clusters of bearing units in a similar fashion as that used for frames 20, 21 (see FIG. 6).

Spindle 11 is adapted for being driven by a motor at speeds of 10,000–40,000 rpm. A bearing assembly supports the spindle and comprises a ceramic roller with thin, dense chromium-plated races. The spindle is supported on the ram 75 which is essentially a cast member, preferably comprised of a series of bulkheads joined at a common side wall. The linear motors 83, 84 operate to actuate the ram along Z-axis by movement of the ram tongues in bearing clusters 80, 81, and 82, such tongues and bearing units defining tracks parallel to the Z-axis. The linear motors 83, 84 can actuate the spindle toward and away from the workpiece 90 at controlled rapid feed (i.e., 240–2400 inches per minute).

When such machine is operated, it carries out a method that increases productivity in drilling a plurality of openings in sequence. Such method particularly comprises indexing, feeding, and sequentially indexing, in a predetermined order, over a plurality of drilling sites in a single workpiece, a single rotary-driven cutting tool by use of a linear motor assembly having at least one of the X or Y axes of movement stiffened by the use of two rigidly interconnected parallel rails spaced apart along such axes and having interference-fitted bearings supported by such rails to carry the supporting structure for such linear motor assembly. The positioning and feeding of such cutting tool is carried out at an acceleration of at least 0.5 G, but can approach two G's, with the drilling spindle being rotated at speeds between 10,000–40,000 rpm and the controlled feed being at speeds of 240–2400 inches per minute. The stiffness of the positioning apparatus allows the assembly to be used to machine cast iron within an accuracy of plus or minus 0.0005 inches. There is no need to use a bushing plate to guide the tools for accuracy. The apparatus may be modified to deploy the worktable with linear motors for carrying out Z-axis movement while limiting the mass-machining assembly to movement in the X and Y directions.

A duty cycle using the machine of this invention to drill 10 openings in a workpiece is shown in FIG. 7. The rate of movement in inches/seconds is shown along the vertical coordinate and a time to carry out the movement is shown along the bottom coordinate. A typical detail for each hole drilling consists of feeding the drill into the workpiece at 240 inches per minute for a depth of 2.20 inches, retracting the drill out of the drilled opening, free of the workpiece, and indexing the axis of the drill over to the next drilling site (such as by movement solely along the X-axis). This procedure is repeated for the first five holes to provide one row of drilled openings. At the end of the completion of drilling for the fifth hole, the drill is carried along the Y-axis (with no X-axis movement) to start a new row of openings and the same sequence is then followed for the remaining 6–10 openings. After the 10th opening is drilled, the drill is retracted to its start position, first along the Z-axis and then concurrently along the Y-Z axes to its zero starting status.

The total cycle time for drilling all of the 10 openings was 12.407 seconds or 2.068 minutes. One single opening is drilled and the drill indexed in a time period of 1.14 seconds.

A significant use advantage of the disclosed assembly is that its footprint (the area occupied by the assembly as it sits on a platform) is relatively small, i.e., $5' \times 8'$, and is readily substitutable for conventional or existing machining units in existing machining facilities while providing enhanced productivity and machining accuracy.

We claim:

1. A linear motor assembly having enhanced mechanical stiffness, the assembly comprising:
    (a) at least one pair of rigidly fixed and interconnected tandem rails defining a first axis of movement and spaced apart normal to such first axis;
    (b) at least one pair of tied frames movable along said pair of rails, each frame presenting at least one pair of opposed parallel bearing surfaces;
    (c) at least one linear motor effective to operate between each rail and frame to selectively move said frames;
    (d) bearings supported between each rail and each bearing surface of each frame, said bearings being preloaded with an interference load while permitting bearing movement; and
    (e) means supported by said tied frames defining other axes of movement actuated by other linear motors.

2. The assembly as in claim 1, in which said first axis is an X-axis for linear movement and said means (e) provides other axes mutually perpendicular to said X-axis.

3. The assembly as in claim 1, in which said means (e) is supported between said tied frames.

4. The assembly as in claim 1, in which at least one of said other axes of movement is defined by tandemly spaced rails.

5. The assembly as in claim 1, in which said frame has a cross-sectional shape selected from C or L shape.

6. The assembly as in claim 1, in which said assembly is enhanced in stiffness by use of tied tandem rails and by forming said means (e) of lightweight cellularized elements.

7. The assembly as in claim 6, in which said cellularized elements, bearing preloading and rigid tandem rail interconnection provides for an assembly having a natural frequency that is equal to or greater than 110 Hz.

8. The assembly as in claim 1, in which said linear motor is a brushless DC motor having an armature coil supported by a frame and a row of permanent magnets adapted to cooperate with said armature coil supported by said tied rails.

9. The assembly as in claim 2, in which said rails are spaced apart a distance of no less than 48 inches along a Y-axis, and said rail interconnection comprising a steel bed filled with sand upon which a truss system is erected to connect said rails.

10. The assembly as in claim 3, in which said frames and means (e) are constituted of aluminum-based material.

11. The assembly as in claim 1, in which said bearings between each rail and each bearing surface comprise a plurality of roller bearings constrained to recirculate within a recirculating track.

12. The assembly as in claim 1, in which said interference loading provides for an interference in the range of 0.0002–0.0005 inches.

13. The assembly as in claim 1, in which each frame provides three pairs of opposed parallel bearing surfaces, and the pairs of frames together provide at least an additional pair of bearing surfaces with each additional surface disposed at about the middle of the frame span, each frame being C-shaped in cross-section and arranged to face the other.

14. A rapid-positioning drilling assembly substitutable for existing drilling assemblies, comprising:
    (a) at last one pair of movable, oppositely-faced tied frames, each frame presenting at least two pairs of opposed parallel bearing surfaces, the center lines connecting said surfaces of each pair being at an angle with respect to the other for a frame;
    (b) a pair of parallel rails for controlling the movement of said frame in spaced planes, said rails being rigidly interconnected and fixed-in-place;
    (c) at least one linear motor effective to operate between one of said rails and one of said frames for moving said one frame, and at least one other linear motor effective to operate between the other of said rails and the other of said frames for moving said other frame;
    (d) roller bearings interposed between said rails and each of said opposed bearing surfaces, said roller bearings being continuously under a preload pressure that provides an interference fit; and
    (e) means supporting a rotary-driven spindle and drilling tool on said tied frames for rapid positioning in concert with movement of said frames by said linear motor.

15. The drilling assembly as in claim 14, which further comprises (f) means for stationing a workpiece to be drilled, said stationing means rigidly clamping said workpiece to avoid deflection of said workpiece by the thrust of said tool when drilling.

* * * * *